(12) United States Patent
Choi et al.

(10) Patent No.: US 6,636,570 B1
(45) Date of Patent: Oct. 21, 2003

(54) PHASE DETECTION APPARATUS FOR COMPENSATING PHASE ROTATION ERROR

(75) Inventors: Han-Jun Choi, Ichon-shi (KR); Suk-Jun Lee, Ichon-shi (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 651 days.

(21) Appl. No.: 09/598,707

(22) Filed: Jun. 21, 2000

(30) Foreign Application Priority Data

Jun. 21, 1999 (KR) ........................ 1999-23302

(51) Int. Cl.[7] .............................. H04L 27/22
(52) U.S. Cl. .................... 375/332; 375/326; 329/304
(58) Field of Search ................ 375/316, 326, 375/279, 280, 329, 331, 332; 329/304, 306, 307

(56) References Cited

U.S. PATENT DOCUMENTS

| | | | |
|---|---|---|---|
| 4,281,412 A | | 7/1981 | Wissel et al. .................. 375/86 |
| 4,866,395 A | * | 9/1989 | Hostetter ..................... 329/309 |
| 5,157,694 A | | 10/1992 | Iwasaki et al. ................ 375/81 |
| 5,574,399 A | * | 11/1996 | Oura et al. .................. 329/306 |
| 6,334,203 B1 | * | 12/2001 | Inagawa ..................... 714/798 |

FOREIGN PATENT DOCUMENTS

| | | | |
|---|---|---|---|
| JP | 64-78054 | 3/1989 | ........... H04L/11/00 |
| JP | 4-220043 | 8/1992 | ........... H04L/27/22 |

* cited by examiner

Primary Examiner—Tesfaldet Bocure
(74) Attorney, Agent, or Firm—Jacobson Holman PLLC

(57) ABSTRACT

A phase detection apparatus for receiving an I-channel signal an a Q-channel signal as a received signal modulated with a quadrature phase-shift keying and compensating a phase rotation error of the received signal, includes: a phase detector for detecting a phase error through the use of the I- and Q-channel signals and providing an error signal; a shifting unit for shifting said I-channel signal by a plurality of predetermined different numbers of bits and providing shifted I-channel signals; a first multiplexing unit, in response to an external selection signal, for selecting signals among said shifted I-channel signals; a subtracting unit for providing difference signals between said selected signals and said Q-channel signal; a comparison unit for comparing said difference signals with a reference signal and producing logic signals; a logic gate for producing a logically ORed signal of said produced logic signals; and a second multiplexing unit, in response to said ORed signal, for selecting a signal from said error signal and said reference signal.

7 Claims, 3 Drawing Sheets

PHASE DETECTION APPARATUS FOR COMPENSATING PHASE ROTATION ERROR

FIELD OF THE INVENTION

The present invention relates to a phase detection apparatus for compensating a phase rotation error of a received signal modulated with a quadrature phase-shift keying (QPSK); and, more particularly, to a phase detection apparatus, which is capable of selecting decision boundaries based on a phase noise level and adjusting decision regions.

DESCRIPTION OF THE PRIOR ART

FIG. 1 illustrates a schematic phase diagram of a signal space for a conventional quadrature phase-shift keying (QPSK).

As shown in FIG. 1, an in-phase component signal (hereinafter, referred to as I-channel signal) and a quadrature component signal (hereinafter, referred to as Q-channel signal) are illustrated. The I-channel signal is generated by multiplying a signal received at a demodulator by a cosine signal with the same frequency as a carrier signal generated by a local oscillator. The Q-channel signal is generated by multiplying the received signal by a sine signal with the same frequency as the carrier signal.

According to QPSK techniques, a received signal at the demodulator is determined based on whether the I- and Q-channel signals are greater than zero or not. However, an original signal with phase $\phi(I+jQ=\exp(j\phi))$ can be rotated by $\theta$ on a communication channel because of a noise signal with a phase $\theta(I+jQ=\exp(-j\theta))$. Thus, the demodulator receives a signal with phase error of $\theta(I+jQ=\exp(j(t\phi-\theta))$ and may not determine the signal correctly. Incorrect signal decision at the demodulator increases bit error rate (BER), resulting in performance degradation.

As described, a conventional recovery circuit in the demodulator has high BER because it does not determine correctly the signal received around the decision boundaries due to the phase noise. In FIG. 1, shaded areas are vulnerable to the phase noise.

However, up to date, there is no circuitry for effectively implementing the above problems.

SUMMARY OF THE INVENTION

It is, therefore, an object of the present invention to provide a phase detection apparatus, for use in a carrier recovery circuit of demodulator for quadrature phase-shift keying (QPSK), which is capable of adjusting decision regions based on a phase noise level and reducing a bit error rate caused by a phase rotation error.

It is an aspect of the present invention to provide a phase detection apparatus for receiving an I-channel signal an a Q-channel signal as a received signal modulated with a quadrature phase-shift keying and compensating a phase rotation error of the received signal, comprising: a phase detector for detecting a phase error through the use of the I- and Q-channel signals and providing an error signal; a shifting means for shifting said I-channel signal by a plurality of predetermined different numbers of bits and providing shifted I-channel signals; a first multiplexing means, in response to an external selection signal, for selecting signals among said shifted I-channel signals; a subtracting means for providing difference signals between said selected signals and said Q-channel signal; a comparison means for comparing said difference signals with a reference signal and producing logic signals; a logic gate for producing a logically ORed signal of said produced logic signals; and a second multiplexing means, in response to said ORed signal, for selecting a signal from said error signal and said reference signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
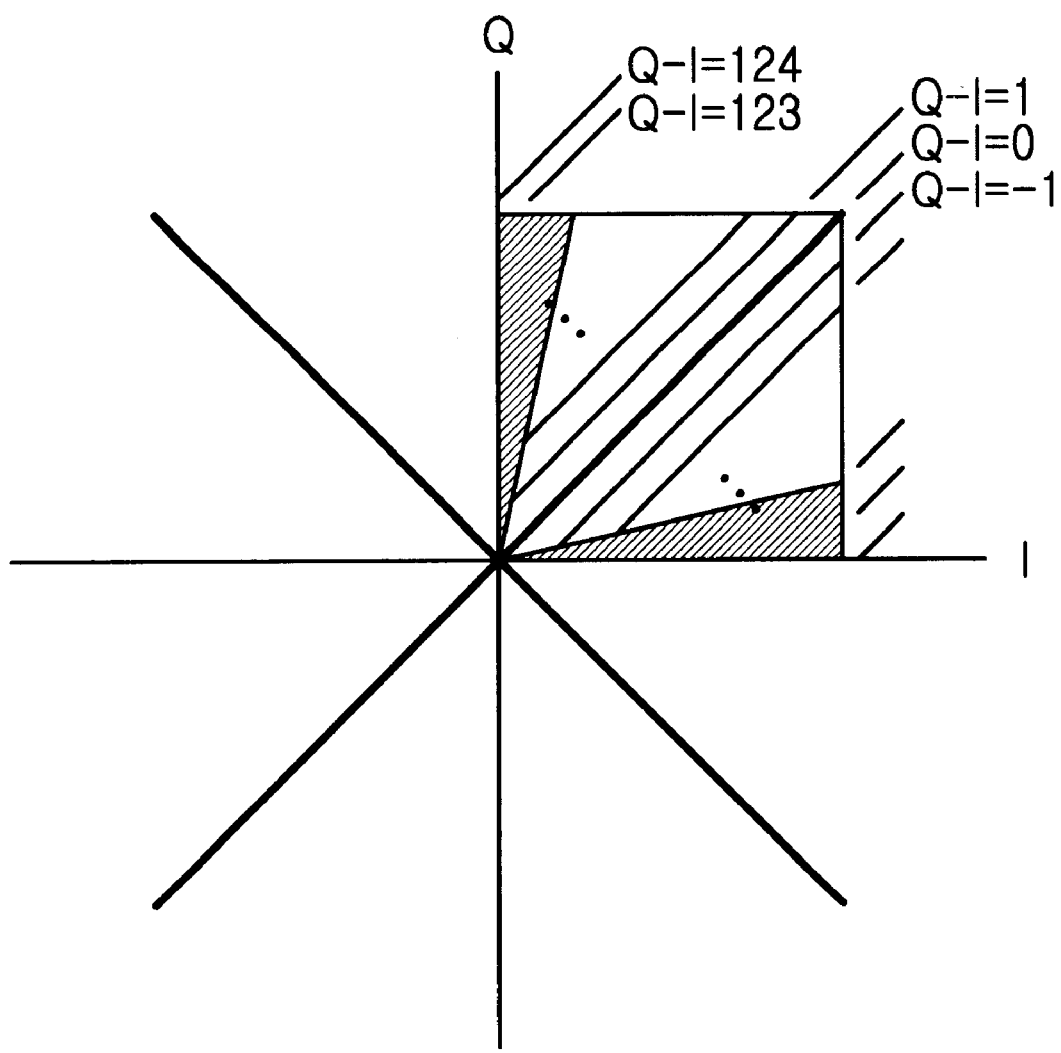
FIG. 1 illustrates a schematic phase diagram of a signal space for conventional QPSK.
Figure 2:
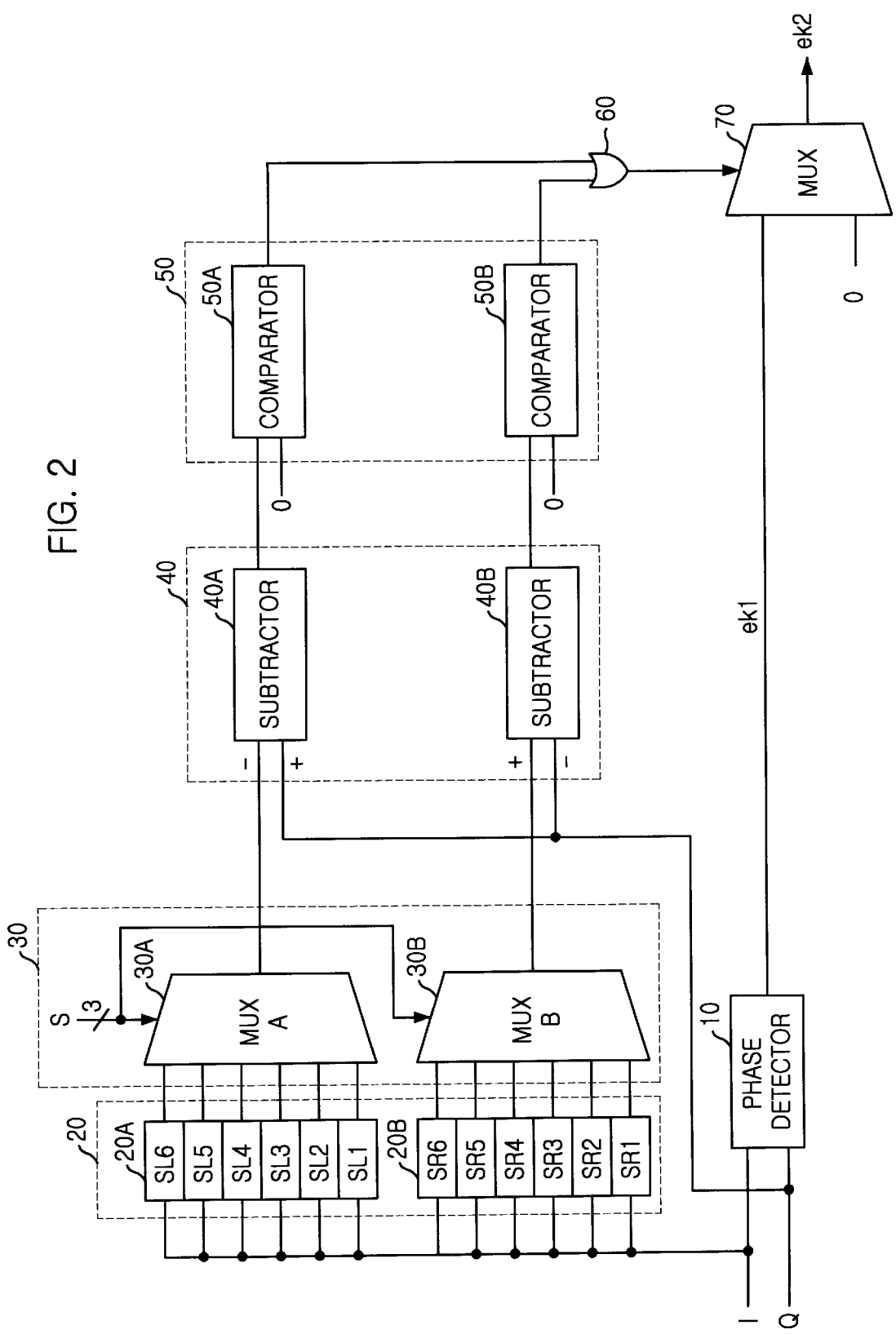
FIG. 2 illustrates a phase detection apparatus in accordance with an embodiment of the present invention.

Referring to FIG. 2, there is illustrated a phase detection apparatus in accordance with an embodiment of the present invention. The phase detection apparatus includes a phase detector 10, a shifting unit 20, a first multiplexing unit 30, a subtracting unit 40, a comparison unit 50, and a second multiplexing unit 70.

As shown, an I-channel signal and a Q-channel signal are inputted to the phase detector 10. The phase detector 10 detects a phase error of a received signal modulated with a quadrature phase-shift keying (QPSK) through the use of its input signals and produces an error signal. The I-channel signal is also provided to the shifting unit 20 which shifts it by a plurality of predetermined different numbers of bits and provides shifted I-channel signals to the first multiplexing unit 30. In response to an external selection signal S, the first multiplexing unit 30 selects signals among the shifted I-channel signals. The selected signals at the first multiplexing unit 30 are provided to the subtracting unit 40, and Q-channel signal is also inputted to the subtracting unit 40. The subtracting unit 40 produces difference signals between the selected signals and the Q-channel signal. The comparison unit 50 connected to the subtracting unit 40 compares the difference signals with a reference signal and produces logic signals. A logic OR gate 60 is connected to the comparison unit 50 to produce a logic signal by performing logic OR operation with the signals from the comparison unit 50. The second multiplexing unit 70 is a multiplexer which is connected to the phase detector 10 and, in response to the logic ORed signal from the logic OR gate 60, selectively outputss a signal from the error signal and the reference signal. The selected signal at the multiplexer 70 is provided to a loop filter (not shown).

The shifting unit 20 includes a first shifter 20A and a second shifter 20B. The first shifter 20A shifts left the I-channel signal by a plurality of the predetermined different numbers of bits and produces the plurality of left-shifted I-channel signals. The second shifter 20B shifts right the I-channel signal by the plurality of the predetermined different numbers of bits and produces the plurality of right-shifted I-channel signals. For example, SL3 of the first shifter 20A represents 3-bit left shifted I-channel signal (8I, in FIG. 3), and similarly SR3 of the second shifter 20B represents 3-bit right shifted I-channel signal ((1/8)I, in FIG. 3). According to the present invention, the shifting unit 20 can be implemented without a shifting circuitry. In other words, it can be implemented by hard-wired shifting of the I-channel signal.

The multiplexing unit 30 composed of first and second multiplexers 30A and 30B, which are connected to the first and second shifters 20A and 20B, respectively. The first multiplexer 30A, in response to the external selection signal S, selects a signal among the left-shifted I-channel signals from the first shifter 20A and provides a first selected I-channel signal. Similarly, the second multiplexer 30B, in response to the external selection signal S, selects a signal among the right-shifted I-channel signals and provides a second selected I-channel signal. The external selection signal S is determined based on a noise signal level, and controls both the multiplexers 30A and 30B. For example, while SL3 is selected at the multiplexer 30A, the multiplexer 30B selects SR3 as its output. The selection signal S, which can be determined by a programmable method, selects particularly shifted signals among the plurality of shifted I-channel signals. When the noise level is high, I-channel signals shifted less are selected to reduce a decision region. On the other hand, when the noise level is low, I-channel signals shifted more are selected to increase the decision region.

The subtracting unit 40 includes first and second subtractors 40A and 40B, that are connected to the first and second multiplexers 30A and 30B, respectively. The first subtractor 40A subtracts the first selected I-channel signal from the Q-channel signal and produces a first difference signal. The second subtractor 40B subtracts the Q-channel signal from the second selected I-channel signal and produces a second difference signal.

The comparison unit 50 includes first and second comparators 50A and 50B, which are connected to the first and second subtractors 40A and 40B, respectively. The first comparator 50A compares the first difference signal with zero from its another input, and produce a logic-1 when the first difference signal is greater than zero. Similarly, the second comparator 50B compares the second difference signal with zero and produces a logic-1 when the second difference signal is greater than zero. The logic signals produced from the first and second comparators 50A and 50B are input to the logic OR gate 60 performing logic OR operation with its inputs. The output signal from the OR gate 60 is provided as a selection signal to the second multiplexing unit 70.

In response to the logic signal from the OR gate 60, the second multiplexing unit 70 selects a signal among the error signal ek1 from the phase detector 10 and the reference signal, and provides it ek2 to the loop filter (not shown).

Figure 3:
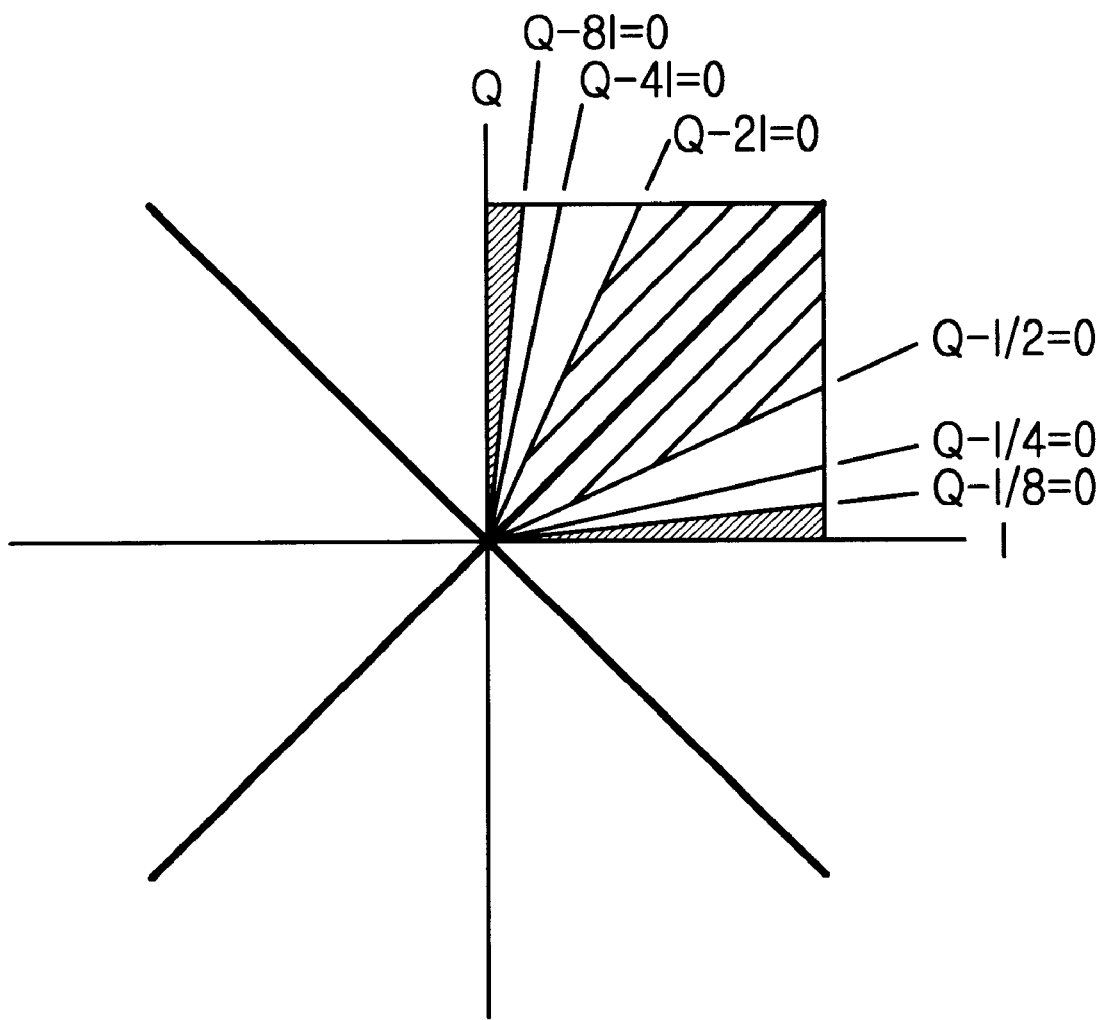
FIG. 3 illustrates a schematic phase diagram of a signal space for QPSK in accordance with the present invention.

FIG. 3 illustrates a schematic phase diagram of a signal space for QPSK in accordance with a present invention, where shaded areas represents regions easily affected by noise.

More specific operations are described with reference to FIGS. 2 and 3. For example, when SL3 and SR3 are selected at the first and second multiplexers 30A and 30B and provided to the subtracting unit 40, the first subtractor 40A produces the first difference signal (Q−8I) and the second subtractor 40B produces the second difference signal ((1/8)I−Q). The first comparator 50A compares the first difference signal with the reference value (zero), and produces a logic-1 when the first difference signal is greater than zero (i.e., Q−8I>0)(shaded area in FIG. 3), a logic-0, otherwise (i.e., Q−8I<=0). Similarly, the second comparator 50B compares the second difference signal with the reference value (zero), and produces a logic-1 when the second difference signal is greater than zero (i.e., (1/8)I−Q>0) (shaded area in FIG. 3), a logic-0, otherwise (i.e., (1/8)I−Q<=0). The logic signals produced from the comparison unit 50 are then logic ORed at the OR gate 60 and provided to the second multiplexing unit 70 as a selection signal. When the logic signal from the OR gate 60 is logic-1, the second mutiplexing unit 70 selects the reference signal (zero) and provides it to the loop filter (not shown) which is then keep the previous value. The second mutiplexing unit 70 provides the error signal from the phase detector 10 to the loop filter (not shown) in response to the logic-0 signal from the OR gate 60.

As shown in FIG. 3, decision boundaries are selected by the selection signal S which is determined based on the phase noise level. Thus the decision region can be adjusted by the selection signal S. For example, when the selection signal selects 1-bit shifted I-channel signals (i.e., 2I and (1/2)I) at the multiplexing unit 30, the decision region is determined by the decision boundaries (Q−2I=0 and Q−I/2=0).

The shaded areas shown in FIG. 3 represent the decision regions determined by the decision boundaries (Q−8I and Q−I/8) which correspond to 3-bit shifted I-channel signals. When a received signal is determined at the shaded regions, zero is provided to the loop filter to overcome the phase rotation error by keeping the previous value.

While the present invention has been described with respect to certain preferred embodiments only, other modifications and variations may be made without departing from the spirit and scope of the present invention as set forth in the following claims.

What is claimed is:

1. A phase detection apparatus for receiving an I-channel signal an a Q-channel signal as a received signal modulated with a quadrature phase-shift keying and compensating a phase rotation error of the received signal, comprising:

a phase detector for detecting a phase error through the use of the I- and Q-channel signals and providing an error signal;

a shifting means for shifting said I-channel signal by a plurality of predetermined different numbers of bits and providing shifted I-channel signals;

a first multiplexing means, in response to an external selection signal, for selecting signals among said shifted I-channel signals;

a subtracting means for providing difference signals between said selected signals and said Q-channel signal;

a comparison means for comparing said difference signals with a reference signal and producing logic signals;

a logic gate for producing a logically ORed signal of said produced logic signals; and a second multiplexing means, in response to said ORed signal, for selecting a signal from said error signal and said reference signal.

2. The phase detection apparatus as recited in claim 1, wherein the shifting means includes:

a first shifter for shifting left said I-channel signal by a plurality of the predetermined different numbers of bits and providing the plurality of left-shifted I-channel signals; and a second shifter for shifting right said I-channel signal by the plurality of the predetermined different numbers of bits and providing the plurality of right-shifted I-channel signals.

3. The phase detection apparatus as recited in claim 2, wherein the shifting means is implemented by hard-wired shifting of the I-channel signal.

4. The phase detection apparatus as recited in claim 2, wherein the multiplexing means includes:
   a first multiplexer, in response to the external selection signal, for selecting a signal among said left-shifted I-channel signals and providing a first selected I-channel signal; and
   a second multiplexer, in response to said external selection signal, for selecting a signal among said right-shifted I-channel signals and providing a second selected I-channel signal.

5. The phase detection apparatus as recited in claim 4, wherein the external selection signal is determined based on a phase noise level.

6. The phase detection apparatus as recited in claim 4, wherein the subtracting means includes:
   a first subtractor for subtracting the first selected I-channel signal from said Q-channel signal and providing a first difference signal; and
   a second subtractor for subtracting said Q-channel signal from the second selected I-channel signal and providing a second difference signal.

7. The phase detection apparatus as recited in claim 6, wherein the comparison means includes:
   a first comparator for comparing the first difference signal with zero and producing a logic-1 when the first difference signal is greater than zero; and
   a second comparator for comparing the second difference signal with zero and producing a logic-1 when the second difference signal is greater than zero.

\* \* \* \* \*